(12) United States Patent
Kim et al.

(10) Patent No.: US 10,163,001 B2
(45) Date of Patent: Dec. 25, 2018

(54) METHOD AND SYSTEM FOR CONTROLLING VIRTUAL MODEL FORMED IN VIRTUAL SPACE

(71) Applicant: Korea Institute of Science and Technology, Seoul (KR)

(72) Inventors: Junsik Kim, Seoul (KR); Jung Min Park, Seoul (KR); Sang Rok Oh, Gangneung-si (KR)

(73) Assignee: Korea Institute of Science and Technology, Seoul (KR)

( * ) Notice: Subject to any disclaimer, the term of this patent is extended or adjusted under 35 U.S.C. 154(b) by 167 days.

(21) Appl. No.: 15/088,604

(22) Filed: Apr. 1, 2016

(65) Prior Publication Data

US 2017/0018119 A1 Jan. 19, 2017

(30) Foreign Application Priority Data

Jul. 14, 2015 (KR) ........................ 10-2015-0099778

(51) Int. Cl.
*G06K 9/00* (2006.01)
*G06T 19/20* (2011.01)
*G06F 3/01* (2006.01)

(52) U.S. Cl.
CPC .......... *G06K 9/00355* (2013.01); *G06F 3/011* (2013.01); *G06F 3/017* (2013.01);
(Continued)

(58) Field of Classification Search
CPC . G06T 19/20; G06T 2219/2021; G06T 13/20; G06T 13/40
See application file for complete search history.

(56) References Cited

U.S. PATENT DOCUMENTS 8,402,393 B2 3/2013 Han et al.
8,576,253 B2 11/2013 Wilson
(Continued)

FOREIGN PATENT DOCUMENTS

JP 2010-165345 A 7/2010
KR 10-0967356 B1 7/2010
(Continued)

OTHER PUBLICATIONS

Jun-Sik Kim and Jung-Min Park, Physics-based Hand Interaction with Virtual Objects, May 2015, IEEE, 2015 IEEE International Conference on Robotics and Automation (ICRA), pp. 3814-3819.*
(Continued)

*Primary Examiner* — Jeffery A Brier
(74) *Attorney, Agent, or Firm* — NSIP Law

(57) ABSTRACT

The virtual model control system has an input device configured to provide input information for formation, movement or transformation of a virtual model; a control device configured to form the virtual model based on the input information received from the input device, move or transform the virtual model, form a plurality of physical particles at the virtual model, form contact point information therefor, and move the plurality of physical particles to update the contact point information; an output device configured to output the virtual model to the outside. When the plurality of physical particles penetrates into another virtual model in the virtual space, the control devices update the contact point information so that the penetrating physical particles are rearranged at an outer side of the another virtual model.

16 Claims, 5 Drawing Sheets

(52) U.S. Cl.
CPC ...... *G06T 19/20* (2013.01); *G06T 2219/2016* (2013.01); *G06T 2219/2021* (2013.01)

(56) References Cited

U.S. PATENT DOCUMENTS

| | | | |
|---|---|---|---|
| 2004/0236541 A1* | 11/2004 | Kramer | G06T 19/20 |
| | | | 703/1 |
| 2006/0235659 A1* | 10/2006 | Stam | G06F 17/5009 |
| | | | 703/2 |
| 2010/0241998 A1 | 9/2010 | Latta et al. | |
| 2012/0309532 A1 | 12/2012 | Ambrus et al. | |
| 2013/0035612 A1* | 2/2013 | Mason | A61B 5/1124 |
| | | | 600/595 |
| 2013/0283214 A1 | 10/2013 | Kim et al. | |
| 2014/0104274 A1 | 4/2014 | Hilliges et al. | |
| 2016/0239080 A1* | 8/2016 | Marcolina | G06F 3/011 |

FOREIGN PATENT DOCUMENTS

| | | |
|---|---|---|
| KR | 10-2013-0117553 A | 10/2013 |
| KR | 10-2014-0010616 A | 1/2014 |
| KR | 10-2014-0024421 A | 2/2014 |

OTHER PUBLICATIONS

Jacobs, Jan, et al. "A soft hand model for physically-based manipulation of Virtual objects." *Virtual Reality Conference (VR), 2011 IEEE*. IEEE, 2011. (8 pages, in English)

* cited by examiner

METHOD AND SYSTEM FOR CONTROLLING VIRTUAL MODEL FORMED IN VIRTUAL SPACE

CROSS-REFERENCE TO RELATED APPLICATION

This application claims priority to Korean Patent Application No. 2015-0099778, filed on Jul. 14, 2015, and all the benefits accruing therefrom under 35 U.S.C. § 119, the contents of which in its entirety are herein incorporated by reference.

BACKGROUND

1. Field

The present disclosure relates to a method and system for controlling a virtual model formed in a virtual space, and more particularly, to a method and system for controlling a contact between virtual models, which occurs when a virtual model moves or transforms in a virtual space, in a stable and efficient way.

[Description about National Research and Development Support]

This study was supported by the Global Frontier Project of Ministry of Science, ICT and Future Planning, Republic of Korea (Project No. 2014054667) under the superintendence of National Research Foundation of Korea.

2. Description of the Related Art

Recently, interfaces in a virtual space are being actively studied. Among them, many techniques about natural user interfaces (UNI) using a body motion as an input means are being developed.

An existing NUI technique generally detects a motion of a human body and then moves a point in a virtual space accordingly. However, even though a pointer is moved by receiving a simple body motion, a detailed behavior of a human body may not be implemented in the virtual space.

Each portion of a human body has a high degree of freedom. Even in a virtual space, it is required to implement free manipulation of an article by using a motion of a human body. In addition, it is also required that an input hand shape is applied to a virtual model and utilized for manipulation. However, in many cases, it is just possible to recognize and handle predetermined gestures and virtual objects of a predetermined shape. This is because it is difficult to model a hand motion in real time in a rapid and stable way due to complexity of the hand.

In this regard, an interface method for detecting a detailed motion of a human body and reflecting the motion to a virtual model in a virtual space has been studied. For this interface, a user directly wears a sensor device to a corresponding body portion to detect a motion, or a motion of a human body is detected using an image sensor such as an RGBD sensor. However, if a user wears a sensor device, it is inconvenient for the user to wear the sensor device, even though a motion may be exactly detected. Also, if an image sensor is used, the human body may be partially hidden during photographing.

Meanwhile, a technique for implementing a detected motion in a virtual space is also being developed. If a motion is implemented not to transform an appearance of a virtual model, computational complexity is low due to a relatively low degree of freedom, but its manipulating method is limited, and physical simulation between implemented virtual models becomes instable. In addition, if a motion is implemented to transform an appearance of a virtual model, even though a local transformation may be implemented in detail, computational complexity is too high to be applied as a real-time interface.

In addition, many existing techniques postulate that virtual models have two contact points. This is fur implementing a motion of a hand which grips an article. However, on occasions, more contact points may be formed, and also a physical interaction may occur just with a single contact point. Therefore, there is a need to develop an interface capable of implementing various instant interactions regardless of the number of contact points and the shape of an article.

SUMMARY

The present disclosure is directed to providing a method and system for controlling a contact between virtual models, which may implement an interaction between virtual models having various motions and shapes through simple computation for control by arranging a plurality of physical particles at a boundary surface of the virtual models and controlling the plurality of physical particles to indirectly implement a physical interaction associated with a contact between the virtual models in a virtual space.

The object of the present disclosure is not limited to the above, and other objects not mentioned herein will be clearly understood from the following disclosure by those skilled in the art.

In one aspect of the present disclosure, there is provided a virtual model control system for controlling a virtual model formed in a virtual space, comprising: an input device configured to provide input information for formation, movement or transformation of a virtual model; a control device configured to form and control a first virtual model and a second virtual model based on the input information; and an output device configured to output the first virtual model and the second virtual model, wherein a plurality of physical particles is dispersively disposed at a boundary surface of the first virtual model, and wherein when the plurality of physical particles penetrates into the second virtual model, the penetrating physical particles are rearranged to be disposed at an outer side of the second virtual model.

According to an embodiment of the present disclosure, the penetrating physical particles may be moved in a direction perpendicular to a penetrated boundary surface of the second virtual model to be arranged in contact with the penetrated boundary surface.

According to an embodiment of the present disclosure, the boundary surface of the first virtual model may be transformed so that the rearranged physical particles are located thereon.

According to an embodiment of the present disclosure, the plurality of physical particles may have a location, a shape, a size, a mass, a speed, an intensity and direction of an applied force, a friction coefficient or an elastic modulus.

According to an embodiment of the present disclosure, the plurality of physical particles may be formed with spherical particles of a unit size.

According to an embodiment of the present disclosure, when the physical particles are rearranged, an intensity of force of each of the physical particles, applied to the second virtual model, may be changed.

According to an embodiment of the present disclosure, an intensity of force of each of the rearranged physical particles, applied to the second virtual model, may be changed according to a moving distance of the rearranged physical particle.

According to an embodiment of the present disclosure, the boundary surface of the first virtual model may be transformable, and a boundary surface of the second virtual model may not be transformable.

According to an embodiment of the present disclosure, the first virtual model may have a framework serving as a basis of a shape of the boundary surface and be moved or transformed according to a motion of the framework.

According to an embodiment of the present disclosure, the first virtual model may be a virtual hand model.

According to an embodiment of the present disclosure, the input device may be a hand recognition device configured to trace a motion of a framework of an actual hand, and the motion of the framework of the first virtual model may be performed corresponding to the motion of the framework of the actual hand.

According to an embodiment of the present disclosure, the input device may be a leap motion sensor or an RGBD sensor.

In another aspect of the present disclosure, there is provided a virtual model control method for controlling a virtual model formed in a virtual space, comprising: forming a first virtual model and a second virtual model; dispersively disposing a plurality of physical particles at a boundary surface of the first virtual model; checking whether the plurality of physical particles penetrates into the second virtual model according to a movement or transformation of the first virtual model or the second virtual model; and rearranging physical particles penetrating into the second virtual model, among the plurality of physical particles, at an outer side of the second virtual model.

According to an embodiment of the present disclosure, the virtual model control method may further include rearranging the boundary surface of the first virtual model so that the rearranged physical particles coincide with the boundary surface of the first virtual model.

According to an embodiment of the present disclosure, the virtual model control method may further include changing an intensity of force of each of the rearranged physical particles, applied to the second virtual model.

According to an embodiment of the present disclosure, the first virtual model may be a virtual hand model having a framework serving as a basis of a shape of the boundary surface, the virtual model control method may further comprise tracing a motion of a framework of an actual hand by using a hand recognition device, and the motion of the framework of the first virtual model may be performed corresponding to the motion of the framework of the actual hand.

DETAILED DESCRIPTION

A virtual model control system according to an embodiment of the present disclosure will be described with reference to the accompanying drawings.

Figure 1:
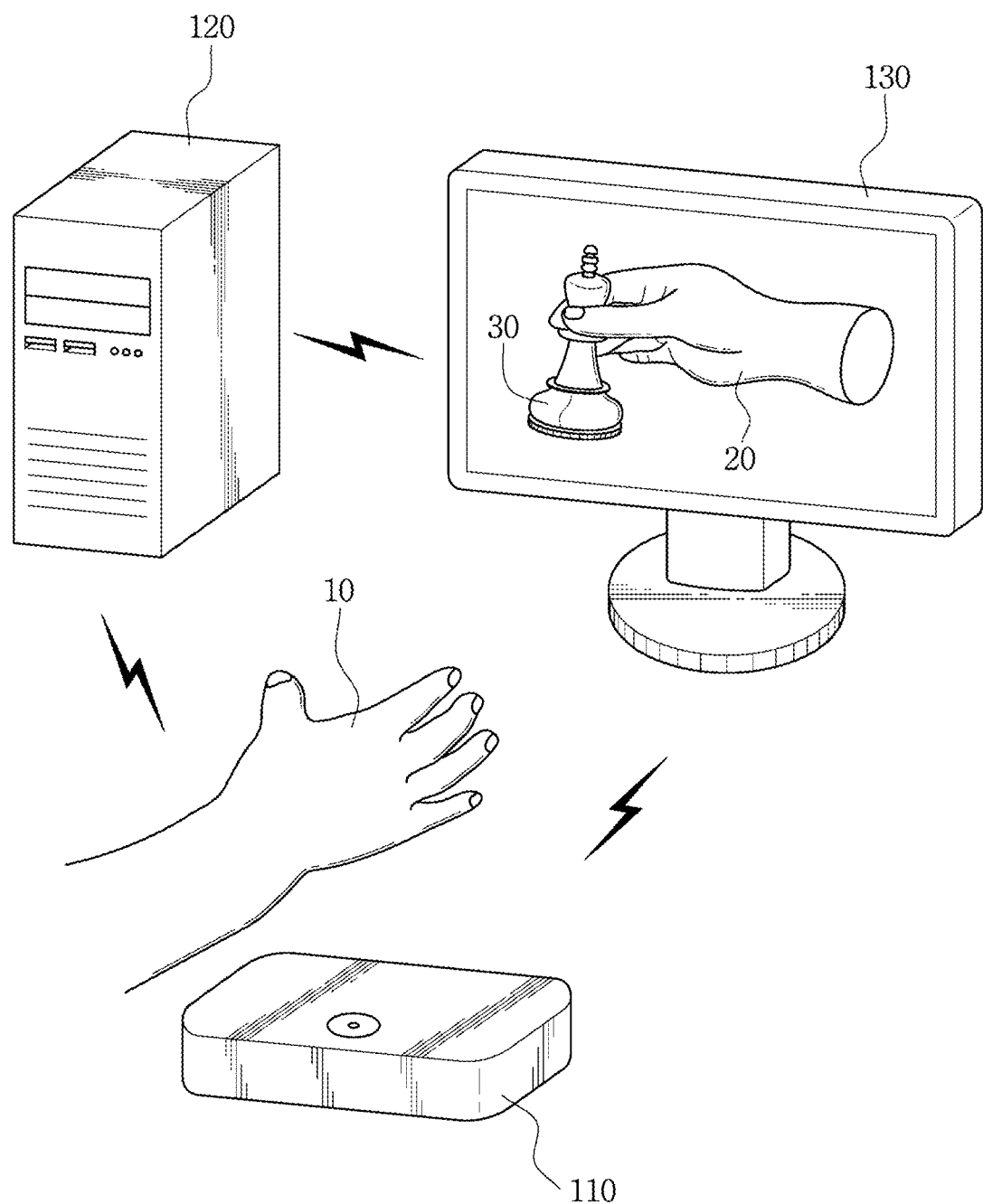
FIG. 1 is a schematic view showing a virtual model control system according to an embodiment of the present disclosure.

Referring to FIG. 1, a virtual model control system 100 according to an embodiment of the present disclosure includes an input device 110, a control device 120, and an output device 130.

The virtual model control system 100 according to an embodiment of the present disclosure implements a physical interaction between virtual models which contact each other while performing a physical movement in a virtual space. The term "virtual model" used herein designates any article or human body present with a predetermined physical quantity in a virtual space.

In this embodiment, the first virtual model 20 is formed with a virtual hand 20, and the second virtual model 30 is formed with a virtual object 30. The virtual models 20, 30 may be analogized to perform a physical movement in a virtual space similar to an actual hand or actual article. The virtual models 20, 30 are just examples for easier understanding, and various other articles or body portions may also be implemented as a virtual model without any limitation.

The input device 110 provides input information for forming the virtual models 20, 30 in a virtual space to the control device 120 or the output device 130. The input device 110 may provide a physical quantity such as a location, a shape, a size, a mass, a speed, an intensity and direction of an applied force, a friction coefficient, an elastic modulus or the like as input information for the virtual models 20, 30. In addition, the input device 110 may provide a variation of a physical quantity such as a location change, a shape change, a speed change or the like in order to move or transform the virtual models 20, 30.

The input device 110 may be a hand recognition device capable of recognizing a shape, a location or the like of the actual hand 10. For example, a leap motion sensor may be used as the input device 110. In addition, various kinds of sensors including an image sensor such as a camera, particularly a RGBD sensor, may be used as the input device 110.

The input device 110 provides input information required for forming the virtual hand 20. In this embodiment, the input device 110 may recognize a shape of the actual hand 10 and analogize a framework arrangement at the actual hand 10 based on the shape. By doing so, the input device 110 may provide input information for forming a framework of the virtual hand 20. For example, if the actual hand 10 clenched, the input device 110 may analogize locations of bones and joints of each finger based on the detected shape and then provide input information for forming a framework of the virtual hand 20 so that the virtual hand 20 also has a clenched shape. In addition, a friction coefficient, a mass or the like required for implementing the virtual hand 20 may also be provided as preset values.

In addition, the input device 110 may detect changes of a shape and location of the actual hand 10 and provide input information required for moving or transforming the virtual hand 20 based thereon. At this time, if the connection between bones and joints of the virtual hand 20 and the degree of freedom at each joint are preset, the input device 110 may provide input information in a simpler way by recognizing just locations of an angle and joint of each bone at the actual hand 10.

Meanwhile, the input device 110 may provide input information by recognizing a motion in an actual space by using a separate sensor as described above, but may also provide input information in a simple way by directly setting physical quantity of a shape, a location or the like.

The control device 120 forms the virtual models 20, 30 in a virtual space based on the input information received from the input device 110. The virtual space has a specific shape and size and may be formed as a three-dimensional space to which an actual physical rule is identically applied. The control device 120 forms a virtual model in the virtual space.

Figure 2:
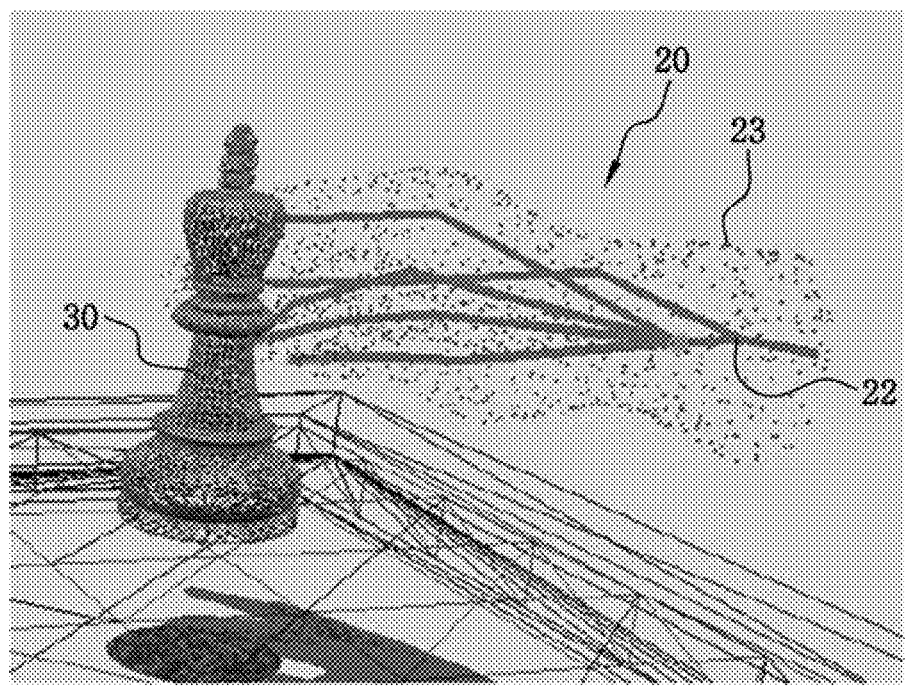
FIG. 2 is a diagram showing a virtual model implemented by the virtual model control system of FIG. 1.

Referring to FIGS. 1 and 2, the virtual hand 20 may include a boundary surface 21 forming its appearance and a framework 22 disposed therein. The boundary surface 21 of the virtual hand 20 is spaced apart from the framework 22 by a predetermined distance to form an appearance of the virtual hand 20. In other words, the control device 120 may form the virtual hand 20 so that the virtual hand 20 includes a framework 22 composed of bones and joints and a boundary surface 21 spaced apart from the virtual hand 20 and forming a shape of the hand. In comparison, the virtual hand 20 may also be composed of only the boundary surface without including the framework therein like the virtual object 30. For reference, for convenience, FIG. 2 does not depict the boundary surface 21 of the virtual hand 20.

If input information for movement or transformation is received from the input device 110, the control device 120 moves or transforms the virtual hand 20 based thereon. At this time, the control device 120 may individually control each portion of the boundary surface 21 of the virtual hand 20 to be moved or transformed, but in order to reduce computational complexity, the control device 120 may move or transform the framework 22 with a relatively simpler structure and then move the boundary surface 21 according to a motion of the framework 22.

Figure 3:
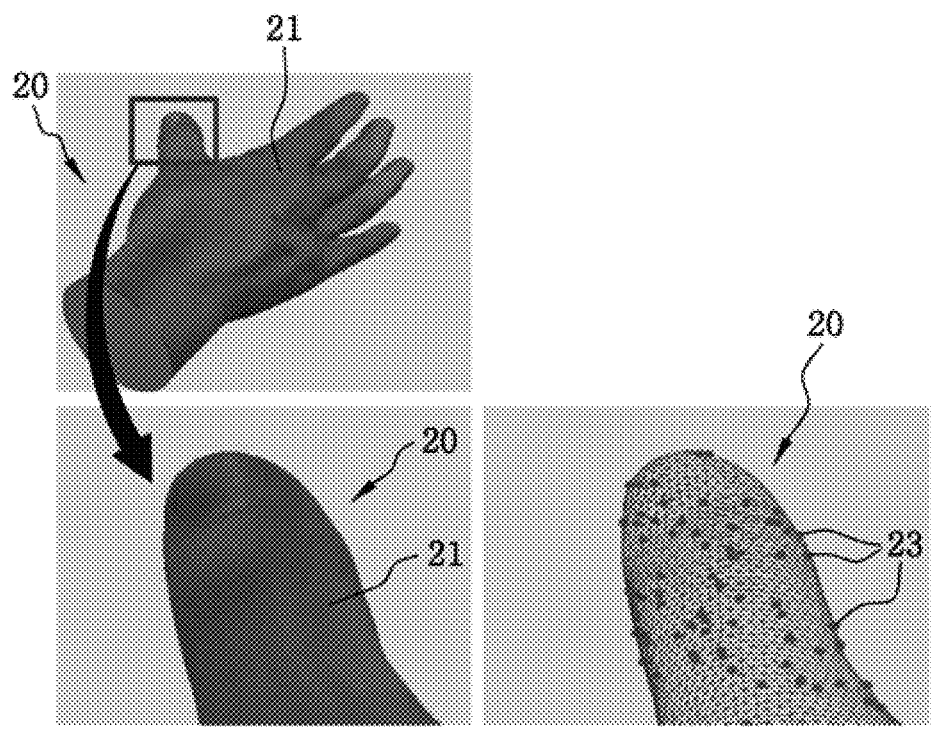
FIG. 3 is a diagram showing a virtual model implemented by the virtual model control system of FIG. 1.
Figure 4:
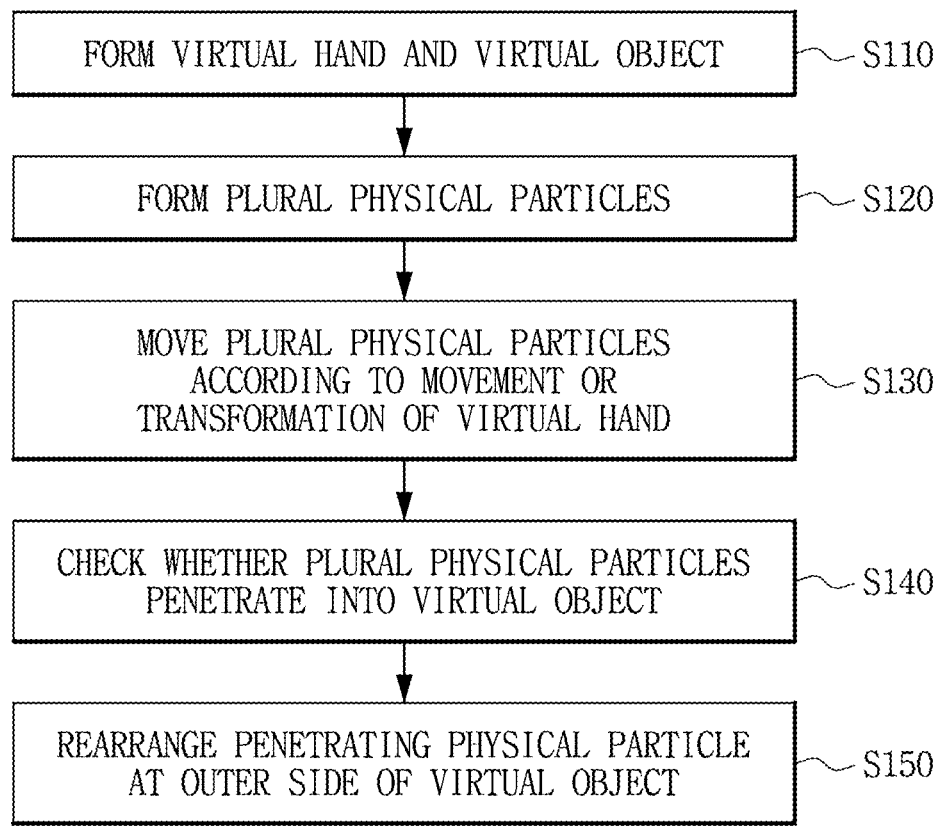
FIG. 4 is a flowchart for illustrating each step of a virtual model control method according to another embodiment of the present disclosure.

Referring to FIGS. 2 and 3, the control device 120 forms a plurality of physical particles 23 at the virtual hand 20 and then forms contact point information therefor.

The plurality of physical particles 23 are small-sized particles with a certain shape and dispersively arranged on the boundary surface 21 of the virtual hand 20. When all regions of the boundary surface 21 of the virtual hand 20 are moved or transformed, computational complexity for controlling is too high. Thus, the plurality of physical particles 23 is formed at some locations on the boundary surface 21 so that the virtual hand 20 may be indirectly controlled with a simpler structure.

The plurality of physical particles 23 may be arranged on the boundary surface 21 of the virtual hand 20 with a predetermined distribution pattern. If the plurality of physical particles 23 is disposed too much, the computational complexity increases, and if the plurality of physical particles 23 is disposed too little, the accuracy in implementation deteriorates. Therefore, in this consideration, the number of the plurality of physical particles 23 disposed in a unit area may be suitably set.

In addition, the plurality of physical particles 23 may have various shapes, but may also be spherical particles of a unit size for easier computation.

For example, if the boundary surface 21 of the virtual hand 20 is composed of 39,225 unit surfaces, spherical physical particles with a diameter of 1 mm may be dispersively arranged on 1,182 unit surfaces among them.

The plurality of physical particles 23 may have various physical quantities. The physical quantities include locations at which the plurality of physical particles 23 is disposed on the boundary surface 21 of the virtual hand 20. In addition, The physical quantities include an intensity and direction of force applied to the plurality of physical particles 23. The plurality of physical particles 23 may further include physical quantities such as a friction coefficient, an elastic modulus or the like.

The control device 120 may change locations of the plurality of physical particles 23. The control device 120 rearranges the plurality of physical particles 23 according to movement or transformation of the virtual hand 20. In other words, the control device 120 may rearrange the plurality of physical particles 23 by tracing a changed location of the boundary surface 21 according to movement or transformation of the virtual hand 20.

In addition, the control device 120 may transform the virtual hand 20 so that the boundary surface 21 is positioned at the locations of the plurality of physical particles 23. In other words, the control device 120 may move the plurality of physical particles 23 first, and then move the portion of the boundary surface 21 where the plurality of physical particles 23 is disposed, based thereon to move or transform the virtual hand 20.

The control device 120 may check whether the virtual hand 20 partially penetrates into the virtual object 30 due to its movement or transformation. By checking whether some of the plurality of physical particles 23 is located within the virtual object 30, it is possible to figure out whether the boundary surface 21 where the penetrating physical particles 23 are disposed penetrates into the virtual object 30.

If the virtual hand 20 partially penetrates into the virtual object 30, the control device 120 may implement a physical interaction between the virtual hand 20 and the virtual object 30. In order to implement the physical interaction, the penetrated portion is rearranged. The control device 120 may rearrange the penetrating physical particles 23 to be located at an outer side of the virtual object 30. In addition, the control device 120 may move or transform the boundary surface 21 according to the rearranged physical particles 23. Meanwhile, during the rearranging procedure, the penetrating physical particles 23 may be arranged to come into contact with the surface of the penetrated virtual object 30. In addition, the penetrating physical particles 23 may be moved in a direction perpendicular to the boundary surface of the virtual object 30.

In addition, the control device 120 may change an intensity of force applied to each of the plurality of physical particles 23 while changing locations of the plurality of physical particles 23. In other words, when the virtual hand 20 moves to contact the virtual object 30, among the plurality of physical particles 23, intensities and directions of forces applied by physical particles 23 contacting the virtual object 30 to the virtual object 30 may be set. At this time, if some of the plurality of physical particles 23 penetrates into the virtual object 30 and thus is rearranged at an outer side of the virtual object 30, the intensity of force applied by the physical particles 23 to the virtual object 30 may be changed according to a distance by which the penetrating physical particles 23 move.

Meanwhile, the process of implementing a physical interaction between the virtual hand 20 and the virtual object 30 by means of control device 120 will be described later in detail.

The output device 130 outputs the virtual hand 20 and the virtual object 30 formed by the control device 120. The output device 130 may be a three-dimensional display which allows a user to feel a space sense.

Meanwhile, the output device 130 may coordinate with the input device 110 to implement a motion of an actual space more realistically in the virtual space. For example, a motion of a user may be implemented in a virtual space by corresponding location information in an actual space, recognized using the input device 110, to the location information in the virtual space, output using the output device 130.

Hereinafter, a method for controlling a virtual model in a virtual space using the virtual model control system 100 according to an embodiment of the present disclosure will be described.

Referring to FIGS. 1 to 4, a virtual model control method according to another embodiment of the present disclosure includes: forming a virtual hand 20 and a virtual object 30 (S110), forming a plurality of physical particles 23 (S120), moving the plurality of physical particles according to a movement or transformation of the virtual hand 20 (S130), checking whether the plurality of physical particles 23 penetrates into the virtual object 30 (S140), and rearranging the penetrating physical particles 23 at an outer side of the virtual object 30 (S150).

First, a virtual hand 20 and a virtual object 30 are formed in a virtual space (S110).

The virtual space may be formed as a three-dimensional space to which an actual physical rule is identically applied. In addition, in the virtual space, other virtual models may be further formed in addition to the virtual hand 20 and the virtual object 30. The virtual spaces may be freely formed and may also be composed of a plurality of spaces.

When the virtual models are generated, each virtual model is set to have its peculiar physical quantity. The virtual models are arranged at corresponding locations with respective shapes. In addition, the virtual models may be formed so that their boundary surfaces can be transformed, similar to the virtual hand 20, or so that their boundary surfaces cannot be transformed, similar to the virtual object 30. In addition, necessary physical quantities may be directly set or may be set based on the input information received from the input device 110.

The virtual hand 20 may include a boundary surface 21 and a framework 22. The virtual hand 20 may be moved or transformed by arranging bones and joints of the framework 22. The boundary surface 21 of the virtual hand 20 may be disposed to be spaced apart from the framework 22 by a predetermined distance. Each region forming the boundary surface 21 may be formed based on the arrangement of the framework 22 to be spaced apart from an adjacent bone or joint by a predetermined distance.

In addition, the virtual hand 20 may be generated based on the input information, which is generated by recognizing the actual hand 10 and received from the input device 110. If the actual hand 10 is located within a detection range of the hand recognition device 110, a shape and location of the actual hand 10 may be recognized and reflected when forming the virtual hand 20. At this time, even though all unit areas on the surface of the actual hand 10 may be traced to recognize the motion, an arrangement of the framework may be analogized from the recognized shape of the actual hand 10 and then a motion of the framework may be traced therefrom. By doing so, a motion of the virtual hand 20 may be rapidly reflected by reflecting the traced arrangement of the framework of the actual hand 10 on the arrangement of the framework 22 of the virtual hand 20.

Next, a plurality of physical particles 23 is formed at the boundary surface 21 of the virtual hand 20 (S120).

The plurality of physical particles 23 is arbitrarily arranged on the boundary surface 21 of the virtual hand 20. The boundary surface 21 may be divided into unit areas, and a part of the unit areas may be randomly extracted so that the plurality of physical particles 23 is arranged at the corresponding unit areas. For accurate and rapid implementation, a suitable number of physical particles 23 may be formed and arranged.

Since the virtual hand 20 is not directly controlled but the virtual hand 20 is simplified into the plurality of physical particles 23 and indirectly controlled, the physical features of the virtual hand 20 may be included in contact point information of the plurality of physical particles 23.

The plurality of physical particles 23 has a physical quantity such as an arrangement location on the boundary surface 21, an intensity and direction of applied force, or the like. In addition, the plurality of physical particles 23 may have a friction coefficient of a skin surface of the actual hand 10. Meanwhile, since the plurality of physical particles 23 is arranged in a partial region of the boundary surface 21, the physical quantities of the plurality of physical particles 23 may be adjusted in consideration of the entire area. For example, if the intensity of force applied to the virtual hand 20 is divided into forces individually applied to the plurality of physical particles 23, an intensity of force applied to an area obtained by dividing the entire area by the number of the physical particles 23 may become an intensity of force applied to a single physical particle 23.

Next, as the virtual hand 20 is moved or transformed, the plurality of physical particles 23 is moved corresponding to the virtual hand 20 (S130).

If a user moves the actual hand 10, the change of framework recognized by the input device 110 may be reflected to a motion of the virtual hand 20 by means of the control device 120. For example, if the user performs a gripping motion with the actual hand 10, the virtual hand 20 grips the virtual object 30 in the virtual space.

If the virtual hand 20 is moved or transformed according to the input information, the plurality of physical particles 23 is rearranged to changed locations at the boundary surface 21 of the virtual hand 20. At this time, the plurality of physical particles 23 may be rearranged after the boundary surface 21 and the framework 22 of the virtual hand 20 are moved or transformed. However, after only the framework 22 is moved or transformed according to the input information, the plurality of physical particles 23 may also be instantly rearranged corresponding thereto. By doing so, without considering all areas of the boundary surface 21 individually, the boundary surface 21 may be indirectly moved or transformed using the plurality of physical particles 23 corresponding to the framework 22.

Meanwhile, the virtual object 30 may also move toward the virtual hand 20. In other words, in a state where the location and shape of the virtual hand 20 are fixed, a speed value may be set to the virtual object 30 so that the virtual object 30 moves toward the virtual hand 20. In addition, it is also possible that the virtual hand 20 and the virtual object 30 are implemented to simultaneously move toward each other. For example, though not shown in the figures, it is possible to implement that a virtual ball flies in a virtual space and a virtual bat moves to hit the flying ball.

As described above, an operation for moving two or more virtual models toward each other to come into contact with each other in a virtual space is implemented in S130.

Next, it is checked whether the plurality of physical particles 23 penetrates into the virtual object 30 (S140).

It is checked whether any physical particle 23 is located inside the virtual object 30 based on the boundary surface of the virtual object 30. S140 is repeatedly executed at every unit operation time of the control device 120 or at preset time intervals. Therefore, if no physical particle 23 penetrates into the virtual object 30, the process does not proceed to the next step (S150), but if a penetrating physical particle 23 is checked, the process proceeds to the next step (S150), and also S140 is continuously executed.

Meanwhile, the plurality of physical particles 23 may penetrate into the virtual object 30 at two or more portions. For example, when the virtual hand 20 grips the virtual object 30, two or more contact points occur. In addition, if the virtual object 30 has a curved shape, two portions of the virtual object 30 may simultaneously contact a single portion of the virtual hand 20. In this case, the physical particles 23 may be individually controlled according to the portion of the boundary surface of the virtual object 30 into which the physical particles 23 respectively penetrate.

Next, if among the plurality of physical particles 23, at least one physical particle 23 penetrates into the virtual object 30 in S140, the penetrating physical particle 23 is rearranged at an outer side of the virtual object 30 (S150).

Figure 5A:
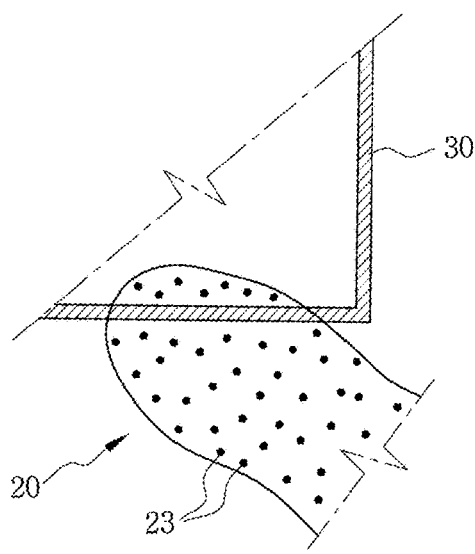
FIG. 5A to 5C are diagrams for illustrating an operation of rearranging physical particles according to the virtual model contact control method of FIG. 4.
Figure 5B:
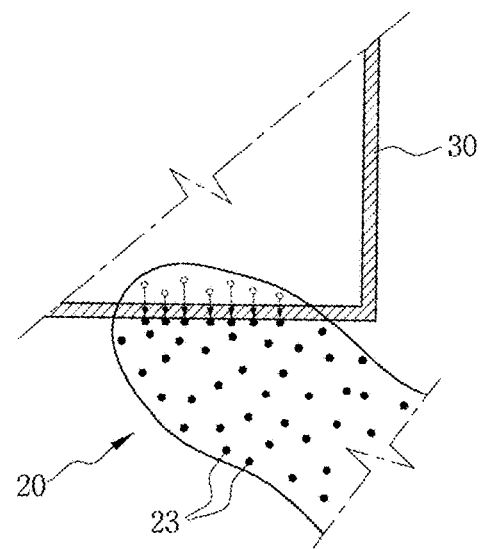

Referring to FIG. 5A, it may be found that the boundary surface 21 and the physical particles 23 of the virtual hand 20 partially penetrate into the virtual object 30. In this case, as shown in FIG. 5B, the penetrating physical particle 23 is rearranged at an outer side of the virtual object 30. At this time, the penetrating physical particle 23 may be moved in a direction perpendicular to the boundary surface of the penetrated virtual object 30 and rearranged to contact the penetrated boundary surface.

Figure 5C:
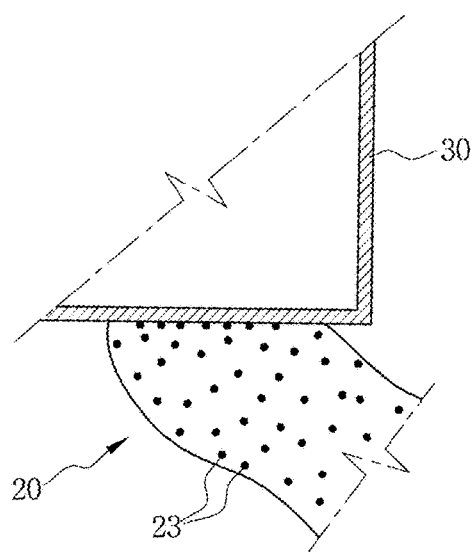

In addition, in S150, as shown in FIG. 5C, the boundary surface 21 of the virtual hand 20 may be transformed so that the rearranged physical particle 23 coincides with the boundary surface 21 of the virtual hand 20. At this time, considering that an interval between the physical particles 23 is excessively decreased due to the rearranged physical particle 23, the boundary surface 21 and the physical particles 23 of the virtual hand 20 already located out of the virtual object 30 may be moved outwards further. By doing so, a shape of the hand transformed for gripping an article with an actual hand may be implemented.

Meanwhile, after the penetrating physical particles 23 are arranged, other physical particles 23 may additionally penetrate into the virtual object 30 due to continuous movement of the virtual hand 21. In this case, by executing S140 for checking, the additionally penetrating physical particles 23 may be rearranged again.

In S150, an intensity of force applied by each of the rearranged physical particles 23 to the virtual object 30 may be changed.

At this time, a ratio of changing the intensity of force applied by the rearranged physical particle 23 to the virtual object 30 may be adjusted depending on a distance by which the rearranged physical particle 23 is moved. In other words, the intensity of force may be changed so that a physical particle 23 deeply penetrating into the virtual object 30 applies a relatively greater force to the virtual object 30, and a physical particle 23 shallowly penetrating into the virtual object 30 applies a relatively smaller force to the physical particles 23.

Meanwhile, the intensity of force transferred between virtual models whose boundary surfaces can be transformed may be set smaller than the intensity of force between virtual models whose boundary surfaces cannot be transformed. By doing so, when the intensity of force is great, an interaction between virtual models is rapidly performed. Thus, a speed for performing an interaction may also be adjusted by changing the intensity of force as described above.

Meanwhile, when the virtual hand comes into contact with the virtual object 30 at two points facing each other, the virtual hand does not contact two points simultaneously. Thus, when an interaction is instantly implemented between them, the virtual object 30 vibrates between the contact points. Therefore, by adjusting the intensity of force transferred according to contacting smaller, such vibration may be delayed, and the contact may be performed stably.

Meanwhile, the virtual model control method according to an embodiment of the present disclosure control the virtual hand 20 where the boundary surface 21 is formed to be transformable and the virtual object 30 where the boundary surface is formed to be not transformable, but it is also possible to control virtual models which entirely have transformable boundary surfaces. At this time, each virtual model may be controlled in the same way as the virtual hand 20 described above. For example, when a motion for gripping a virtual soft ball with a virtual hand is implemented, both the virtual hand and the virtual ball are transformed due to contact, and the degree of transformation thereof may be adjusted by changing an elastic modulus of the boundary surface.

If the virtual model control method and system 100 according to the present disclosure as described above are used, when virtual models come into contact, the contact of the virtual models may be accurately implemented and controlled with less computational complexity by indirectly tracing and transforming the boundary surface by using the plurality of physical particles 23, without tracing and transforming all regions of the boundary surface individually.

Even though embodiments of the present disclosure have been described in detail with reference to the accompanying drawings, the present disclosure is not limited to the embodiments but may be modified in various ways without departing from the scope of the present disclosure. Therefore, the embodiments of the present disclosure are not to limit the scope of the present disclosure but to illustrate the present disclosure, and the scope of the present disclosure is not limited by the embodiments. For this reason, the embodiments described above should be interpreted as illustratively, rather than limitatively. The scope of the present disclosure is defined by the appended claims, and all equivalents should be interpreted as falling within the scope of the present disclosure.

What is claimed is:

1. A virtual model control system for controlling a virtual model formed in a virtual space, comprising:
    a sensor configured to provide input information;
    a processor configured to
        control a first virtual model and a second virtual model based on the input information,
        dispersively dispose a plurality of physical particles at a boundary surface of the first virtual model, and
        in response to particles among the plurality of physical particles penetrating into the second virtual model, move the particles by respective distances to be disposed outside of the second virtual model and change respective magnitudes of force applied by the particles on the second virtual model based on the respective distances; and
    a display configured to display the first virtual model and the second virtual model, wherein the boundary surface of the first virtual model is transformed so that the rearranged physical particles are located on the boundary surface.

2. The virtual model control system according to claim 1, wherein the particles are moved in a direction perpendicular to a penetrated boundary surface of the second virtual model to be arranged in contact with the penetrated boundary surface.

3. The virtual model control system according to claim 1, wherein each particle among the plurality of physical particles has a location, a shape, a size, a mass, a speed, an intensity and direction of an applied force, a friction coefficient, or an elastic modulus.

4. The virtual model control system according to claim 1, wherein the plurality of physical particles is formed with spherical particles of a unit size.

5. The virtual model control system according to claim 1, wherein when the particles are moved, the respective magnitudes of force applied by the particles on the second virtual model are changed.

6. The virtual model control system according to claim 1, wherein the boundary surface of the first virtual model is transformable, and
wherein a boundary surface of the second virtual model is not transformable.

7. The virtual model control system according to claim 1, wherein the first virtual model has a framework serving as a basis of a shape of the boundary surface and is moved or transformed according to a motion of the framework.

8. The virtual model control system according to claim 7, wherein the first virtual model is a virtual hand model.

9. The virtual model control system according to claim 8, wherein the sensor comprises a hand recognizer configured to trace a motion of a framework of an actual hand, and
wherein the motion of the framework of the first virtual model is performed corresponding to a motion of a framework of the actual hand.

10. The virtual model control system according to claim 9,
wherein the is sensor comprises a leap motion sensor or an RGBD sensor.

11. A virtual model control method for controlling a virtual model formed in a virtual space, comprising:
forming a first virtual model and a second virtual model;
dispersively disposing a plurality of physical particles at a boundary surface of the first virtual model;
checking whether the plurality of physical particles penetrates into the second virtual model according to a movement or transformation of the first virtual model or the second virtual model; and
in response to particles among the plurality of physical particles penetrating into the second virtual model, moving the particles by respective distances to be disposed outside of the second virtual model and changing respective magnitudes of force applied by the particles on the second virtual model based on the respective distances,
wherein the first virtual model has a framework serving as a basis of a shape of the boundary surface and is moved or transformed according to a motion of the framework.

12. The virtual model control method according to claim 11, further comprising:
tracing a motion of a framework of an actual hand by using a hand recognition device,
wherein the motion of the framework of the first virtual model corresponds to the motion of the framework of the actual hand.

13. The virtual model control method of claim 11, further comprising:
moving a portion of the boundary surface to a location of the moved particles.

14. The virtual model control method of claim 13, further comprising:
further moving the moved portion of the boundary surface and the moved particles, which are located outside of the second virtual model, in response to determining that an interval between the plurality of physical particles is excessively decreased due to the moving of the particles.

15. The virtual model control method of claim 11, wherein the respective magnitudes of force are adjusted based on how deeply the respective particles penetrate the second virtual model.

16. A virtual model control method for controlling a virtual model formed in a virtual space, comprising:
forming a first virtual model and a second virtual model;
dispersively disposing a plurality of physical particles at a boundary surface of the first virtual model;
checking whether the plurality of physical particles penetrates into the second virtual model according to a movement or transformation of the first virtual model or the second virtual model;
in response to particles among the plurality of physical particles penetrating into the second virtual model, moving the particles by respective distances to be disposed outside of the second virtual model and changing respective magnitudes of force applied by the particles on the second virtual model based on the respective distances; and
transforming the boundary surface of the first virtual model so that the rearranged physical particles are located on the boundary surface.

* * * * *